US007532450B2

(12) United States Patent

Durth et al.

(10) Patent No.: US 7,532,450 B2

(45) Date of Patent: May 12, 2009

(54) SURGE SUPPRESSOR

(75) Inventors: Rainer Durth, Horn-Bad Meinberg (DE); Martin Wetter, Detmold (DE)

(73) Assignee: Pheonix Contact GmbH & Co. KG, Blomberg (DE)

( * ) Notice: Subject to any disclaimer, the term of this patent is extended or adjusted under 35 U.S.C. 154(b) by 174 days.

(21) Appl. No.: 10/596,250

(22) PCT Filed: Dec. 7, 2004

(86) PCT No.: PCT/EP2004/013897

§ 371 (c)(1),
(2), (4) Date: Jun. 6, 2006

(87) PCT Pub. No.: WO2005/060059

PCT Pub. Date: Jun. 30, 2005

(65) Prior Publication Data

US 2007/0086136 A1 Apr. 19, 2007

(30) Foreign Application Priority Data

Dec. 9, 2003 (DE) ................................ 103 57 945

(51) Int. Cl.

*H02H 1/04* (2006.01)
*H02H 3/22* (2006.01)
*H02H 9/06* (2006.01)
*H02H 1/00* (2006.01)

(52) U.S. Cl. ........................ 361/120; 361/117; 361/129; 361/130

(58) Field of Classification Search ........................ None
See application file for complete search history.

(56) References Cited

U.S. PATENT DOCUMENTS

| | | | | |
|---|---|---|---|---|
| 4,433,354 | A | 2/1984 | Lange et al. | |
| 4,769,736 | A * | 9/1988 | Boy | 361/120 |
| 5,594,613 | A | 1/1997 | Woodworth et al. | |
| 5,604,400 | A | 2/1997 | Altmaier et al. | |
| 6,111,740 | A * | 8/2000 | Danowsky et al. | 361/120 |
| 7,324,319 | B2 * | 1/2008 | Durth et al. | 361/120 |
| 2004/0246646 | A1 | 12/2004 | Durth et al. | |

FOREIGN PATENT DOCUMENTS

| | | |
|---|---|---|
| DE | 41 41 681 A1 | 7/1993 |
| DE | 196 04 947 C1 | 7/1997 |

* cited by examiner

*Primary Examiner*—Stephen W Jackson
*Assistant Examiner*—Dharti H Patel
(74) *Attorney, Agent, or Firm*—David S. Safran; Roberts Mlotkowski Safran & Cole, P.C.

(57) ABSTRACT

An overvoltage protection means having a first electrode (1), a second electrode (2), a breakdown spark gap between the two electrodes (1, 2), and a housing (3) which holds the electrodes (1, 2). When the breakdown spark gap is ignited, an arc (4) is formed between the two electrodes (1, 2) within the discharge space (5) which connects the two electrodes (1, 2). The overvoltage protection arrangement has an especially high line follow current extinguishing capacity, but can nevertheless be easily built, and the discharge space (5) is made such that it runs at least partially transversely and/or opposite the direction of the electrical field of the prevailing line voltage so that the distance to be overcome by the arc (4) between the two electrodes (1, 2) has a transverse component relative to the electrical field.

11 Claims, 3 Drawing Sheets

SURGE SUPPRESSOR

BACKGROUND OF THE INVENTION

1. Field of the Invention

The invention relates to an overvoltage protection means having a first electrode, having a second electrode, with a breakdown spark gap which is formed between the two electrodes, and with a housing which holds the electrodes, when the breakdown spark gap is ignited, an arc forming between the two electrodes within a discharge space which connects the two electrodes.

2. Description of Related Art

Electrical, but especially electronic measurement, control and switching circuits, mainly also telecommunications equipment and systems, are sensitive to transient overvoltages, as can occur especially by atmospheric discharges, but also by switching operations or short circuits in power supply grids. This sensitivity has increased to the extent that electronic components, especially transistors and thyristors, are being used; in particular, increasingly used integrated circuits are highly endangered by transient overvoltages.

Electrical circuits work with the voltage specified for them, the rated voltage (generally≈line voltage), normally without interference. This does not apply when overvoltages occur. Overvoltages are all voltages which are above the upper tolerance limit of the rated voltage. They also include mainly transient overvoltages which can occur due to atmospheric discharges, but also due to switching operations or short circuits in power supply grids, and can be metallically, inductively or capacitively coupled into electrical circuits. Overvoltage protection means have been developed and have been known for more than 20 years to protect electrical or electronic circuits, especially electronic measurement, control and switching circuits, mainly also telecommunications equipment and systems wherever they are used against transient overvoltages wherever they are used.

An important component of an overvoltage protection means of the type under consideration here is at least one spark gap which responds at a certain overvoltage, the sparkover voltage, and thus, prevents overvoltages which are larger than the sparkover voltage of the spark gap from occurring in the circuit which is protected by an overvoltage protection means.

It was stated at the beginning that the overvoltage protection means in accordance with the invention has two electrodes and a breakdown spark gap which is formed between the two electrodes. In practice, these breakdown spark gaps are often also called air breakdown spark gaps, within the framework of the invention, a breakdown spark gap also meaning an air breakdown spark gap. However, here, besides air, another gas can also be present between the electrodes. The region of the overvoltage protection means in which the arc forms when the breakdown spark gas ignites, is hereinafter called the discharge space. It is generally the space between the two electrodes.

In addition to overvoltage protection means with a breakdown spark gap, there are also overvoltage protection means with a flashover spark gap in which a creeping discharge occurs when it responds.

Overvoltage protection means with a breakdown spark gap as compared to overvoltage protection means with a flashover spark gap have the advantage of higher surge current-carrying capacity, but the disadvantage of a higher and also not especially constant sparkover voltage. Therefore, different overvoltage protection means with a breakdown spark gap have already been suggested and have been improved with respect to the sparkover voltage. Here, in the area of the electrodes or the breakdown spark gap which acts between the electrodes, ignition aids have been implemented in different ways, for example, such that, between the electrodes, there has been at least one ignition aid which triggers a creeping discharge and which projects at least partially into the breakdown spark gap, which is made in the manner of a crosspiece and which is made of plastic (compare, for example, German Patent Application DE 41 41 681 A1 or German Patent Application DE 44 02 615 A1 and corresponding U.S. Pat. No. 5,604,400).

The aforementioned ignition aids, which are provided in the known overvoltage protection means, can likewise be called "passive ignition aids." The are referred to as "passive ignition aids" because they do not respond "actively" themselves, but respond only by an overvoltage which occurs on the main electrodes.

German Patent Application DE 198 03 636 A1 and corresponding U.S. Pat. No. 6,111,740 likewise disclose an overvoltage protection means having two electrodes, with a breakdown spark gap which acts between the two electrodes, and an ignition aid. In this known overvoltage protection means, the ignition aid is made as an "active ignition aid," in contrast to the above described ignition aids which trigger a creeping discharge, specifically in that in addition to the two electrodes, called the main electrodes there, there are two more ignition electrodes. These two ignition electrodes form a second breakdown spark gap which is used as an ignition spark gap. In this known overvoltage protection means, the ignition aid includes not only the ignition spark gap, but also an ignition circuit with an ignition switching device. When there is an overvoltage on this known overvoltage protection means, the ignition circuit with the ignition switching device provides for response of the ignition spark gap. The ignition spark gap and the two ignition electrodes are arranged with respect to the two main electrodes such that, because the ignition spark gap has responded, the breakdown spark gap between the two main electrodes, called the main spark gap, responds. Response of the ignition spark gap leads to ionization of the air present in the breakdown spark gap so that, after response of the ignition spark gap, the breakdown spark gap also suddenly responds between the two main electrodes, therefore the main spark gap.

In the known, above described embodiments of overvoltage protection means with ignition aids, the ignition aids lead to an improved, specifically lower and more constant sparkover voltage.

In overvoltage protection means of the type under consideration—with or without using an ignition aid—when the breakdown spark gap ignites, the resulting are forms a low-impedance connection between the two electrodes. First of all, the lightning-stroke current to be diverted flows intentionally by way of this low-impedance connection. However, when the line voltage is present, then an unwanted line follow current follows by way of the low-impedance connection of the overvoltage protection means, so that an effort is made to extinguish the arc as quickly as possible after the completed diversion process. One possibility for achieving this object is to increase the arc length, and thus, the arc voltage.

One possibility for extinguishing an arc after a diversion process, specifically increasing the arc length and thus the arc voltage, is implemented in the overvoltage protection as is known from the above mentioned German Patent Application DE 44 02 615 A1 and corresponding U.S. Pat. No. 5,604,400. The overvoltage protection means known from German Patent Application DE 44 02 615 A1 and corresponding U.S. Pat. No. 5,604,400 has two narrow electrodes which are each angularly shaped and have an arcing horn and a connecting leg angled off from it. In addition, the arcing horns of the electrodes are provided with a hole in their areas bordering the connecting legs. The holes provided in the arcing horns of the electrodes provide for the resulting arc "being set into motion" by a thermal pressure effect at the instant of response of the overvoltage protection element, therefore of ignition, and migrating away from its origin. Since the arcing horns of the electrodes are arranged in a V-shape relative to one another, the segment to be bridged by the arc is thus enlarged when the arc migrates out, by which the arc voltage also rises. However, the disadvantage here is that, to achieve the desired increase of arc length, the geometrical dimension of the electrodes must be correspondingly large, so that the overvoltage protection means is also tied altogether to certain geometrical constraints.

Another possibility for extinguishing the arc after the diversion process consists in cooling the arc by the cooling action of insulation walls and the use of insulators which release gas. Here, a strong flow of the extinguishing gas is necessary; this requires high construction effort.

Moreover, it is possible to increase the arc voltage by increasing the pressure. To do this, German Patent DE 196 04 947 C1 proposes selecting the volume in the housing interior such that the arc causes a pressure increase to a multiple of atmospheric pressure. Here the increase in the follow current extinguishing capacity is achieved by a pressure-dependent effect on the arc field strength. So that this overvoltage protection means works reliably, a very pressure-resistant housing is, however, necessary, on the one hand, the level of the line voltage must be known relatively exactly to be able to design the volume in the housing interior accordingly, on the other hand.

If the arc is extinguished in overvoltage protection means of the type under consideration, first of all, the low-impedance connection between the two electrodes is interrupted, the space between the two electrodes, i.e., the discharge space, is however still almost completely filled with a conductive plasma. The plasma which is present reduces the sparkover voltage between the two electrodes such that, at the prevailing line voltage, re-ignition of the breakdown spark gap can occur. This problem occurs especially when the overvoltage protection means has an encapsulated or half-open housing, since then cooling or volatilization of the plasma is prevented by the essentially closed housing.

To prevent re-ignition of the overvoltage protection means, i.e., the breakdown spark gap, in the past various measures were taken to drive the ionized gas cloud away from the ignition electrodes or to cool it. To do this, structurally complex labyrinths and cooling bodies are used, which make production of the overvoltage protection means more expensive.

SUMMARY OF THE INVENTION

The object of the invention is to devise an overvoltage protection means of the initially described type which is distinguished by a high line follow current extinguishing capacity, but which can nevertheless be easily built.

The overvoltage protection means in accordance with the invention in which this object is achieved is characterized, first of all, essentially in that the discharge space is made such that it runs at least partially transversely and/or opposite the direction of the electrical field of the prevailing line voltage, so that the distance to be overcome by the arc between the two electrodes has a transverse component to the electrical field. This results in the electrical field or electric voltage on the two electrodes no longer being able to continuously accelerate the free charge carriers contained in the plasma from one electrode to the other, by which a line follow current is prevented.

In the known overvoltage protection means, the conductive plasma which is present after the actual diversion process, but unwanted, or the free charge carriers contained in it are "removed" by the plasma being driven away from the electrodes. These overvoltage protection means which are also called "blowout" spark gap arrangements, first of all, have the disadvantage that, to "blow out" the plasma, a relatively strong flow must be produced within the overvoltage protection means, for which generally gas-releasing insulation materials are used. The hot plasma is then removed to the outside into the vicinity through blowout openings in the housing of the overvoltage protection means. This has the disadvantage that at the installation site of the overvoltage protection means certain minimum distances to other voltage-carrying or flammable components must be maintained; this enables use of these blowout overvoltage protection means only under certain installation conditions.

In contrast, in the overvoltage protection means in accordance with the invention "blowout" of the hot plasma can be eliminated. The arrangement and geometrical configuration of the discharge space in accordance with the invention prevents the unwanted result of the presence of a plasma, a line follow current forming after the actual diversion process without the need to drive the plasma away from the electrodes or to cool it.

Structurally, the discharge space can be made such that it has at least three regions, the first region being connected to the first electrode, the second region being connected to the second electrode and the third region being connected on the one hand to the first region, and on the other hand, to the second region. The third region thus establishes the connection between the first region and the second region and also between the first electrode and the second electrode. The third region is made structurally such that the free charge carriers contained in the plasma are not accelerated in it from the first region to the second region or vice versa by the electric field of the prevailing line voltage, or are accelerated only slightly. For this reason, the third region has at least one component transverse to the electrical field. In particular, the third region can be aligned essentially perpendicularly or even partially opposite to the direction of the electric field of the prevailing line voltage.

According to one advantageous configuration of the invention, the discharge space is structurally implemented in that the side of the first electrode facing the second electrode and the side of the second electrode facing the first electrode are each partially covered with an insulating or high resistance material, the region of the first electrode and of the second electrode not covered with the insulating or high resistance material being offset relative to one another. The execution and the arrangement of the insulating or high resistance material on the first and second electrode can easily determine the shape of the discharge space. If a high resistance but still conductive material is applied to the two electrodes, with a resistance so great that an arc cannot form on its surface due to current limitation, after the actual diversion process, this leads to the free charge carriers present in the discharge space between the two electrodes being separated by the electrical field of the prevailing line voltage and, depending on the polarity of the high resistance material, being "sucked" on the first or the second electrode.

In accordance with the invention, the configuration of the discharge space between the two electrodes, the discharge space having at least one transverse component to the electrical field, as described above, prevents formation of an unwanted line follow current. However, at the same time, the sparkover voltage of the breakdown spark gap is also increased; this is generally not desirable either. Therefore, in one preferred configuration of the overvoltage protection means in accordance with the invention, there is an active ignition aid for reducing the sparkover voltage. Fundamentally, different active ignition aids known from the prior art can be used for this purpose. According to one preferred configuration, however, the active ignition aid is implemented by a series connection of a voltage switching device and an ignition element being to the two electrodes, the sparkover voltage of the voltage switching device being below the sparkover voltage of the breakdown spark gap, and first, a diversion current flowing via the ignition element when the voltage switching device responds.

The voltage switching device is chosen such that, at the sparkover voltage of the overvoltage protection means, it becomes conductive, therefore "switches." As the voltage switching device, there can be a varistor, suppressor diode or a gas-filled voltage arrester. The ignition element being preferably made of a conductive plastic, a metal material or a conductive ceramic and is in mechanical contact with the second electrode.

If an overvoltage occurs in the overvoltage protection means with the above described active ignition aid which is at least equal to the sparkover voltage dictated by the voltage switching device, the voltage switching device responds, so that a diversion current begins to flow over the series connection of the first electrode—voltage switching device—ignition element—second electrode. By the initial ignition, the current produces a conductive plasma which can be introduced into the discharge space, by which the breakdown spark gap between the first electrode and the second electrode ignites, and thus, an arc is formed in the discharge space. With respect to other details of such an active ignition aid which can also be called "current ignition," reference is made to DE 101 46 728 A1 and corresponding U.S. Patent Application Publication 2004/0246646.

In particular, there numerous possibilities for embodying and developing the overvoltage protection means in accordance with the invention. Reference is made to the following description of preferred exemplary embodiments in conjunction with the accompanying drawings.

DETAILED DESCRIPTION OF THE INVENTION

Figure 1:
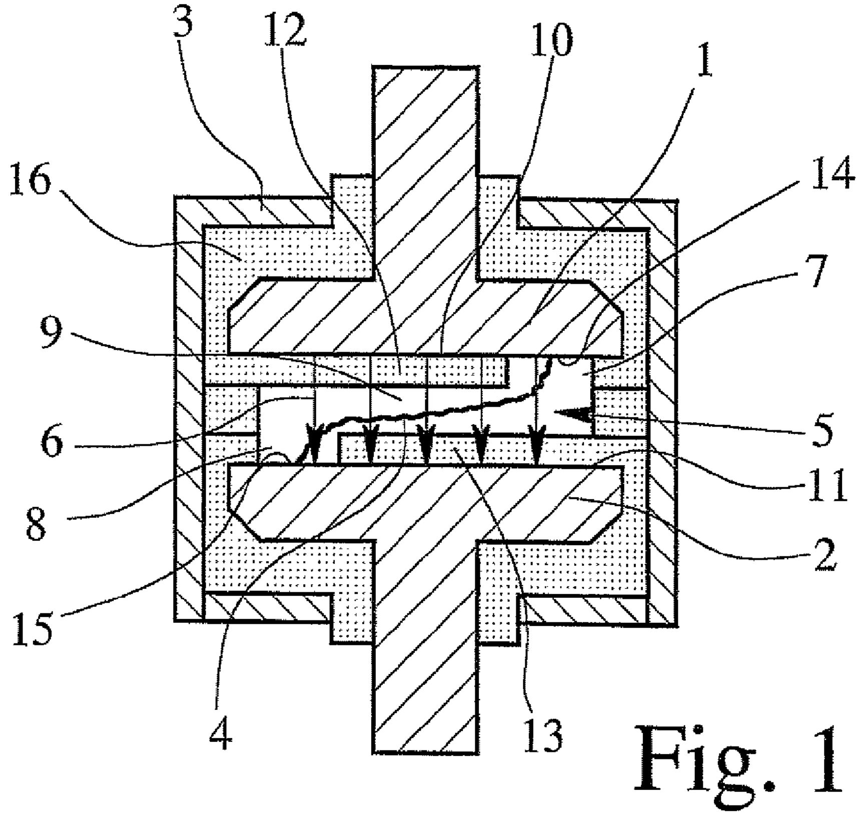
FIG. 1 is a schematic representation of a first exemplary embodiment of the overvoltage protection means in accordance with the invention.

Different embodiments of an overvoltage protection means in accordance with the invention are shown in the figures. The overvoltage protection means which is shown only with respect to its fundamental structure includes a first electrode 1, a second electrode 2 and a housing 3 which holds the electrodes 1, 2. Between the two electrodes 1, 2, there is a breakdown spark gap, an arc 4 forming between the electrodes 1, 2 when the breakdown spark gap is ignited.

In accordance with the invention, between the two electrodes 1, 2, there is a discharge space 5, the discharge space 5 running at least partially obliquely (FIG. 2), partially transversely (FIGS. 1, 5 and 6), partially opposite (FIG. 3) or partially transversely and opposite (FIG. 4) to the direction of the electrical field of the prevailing line current shown by the arrows 6. In all exemplary embodiments, the discharge space 5 has at least one component that is transverse to the electrical field. In contrast to known overvoltage protection means, thus discharge space 5 does not encompass the entire space between the electrodes 1, 2.

Figure 2:
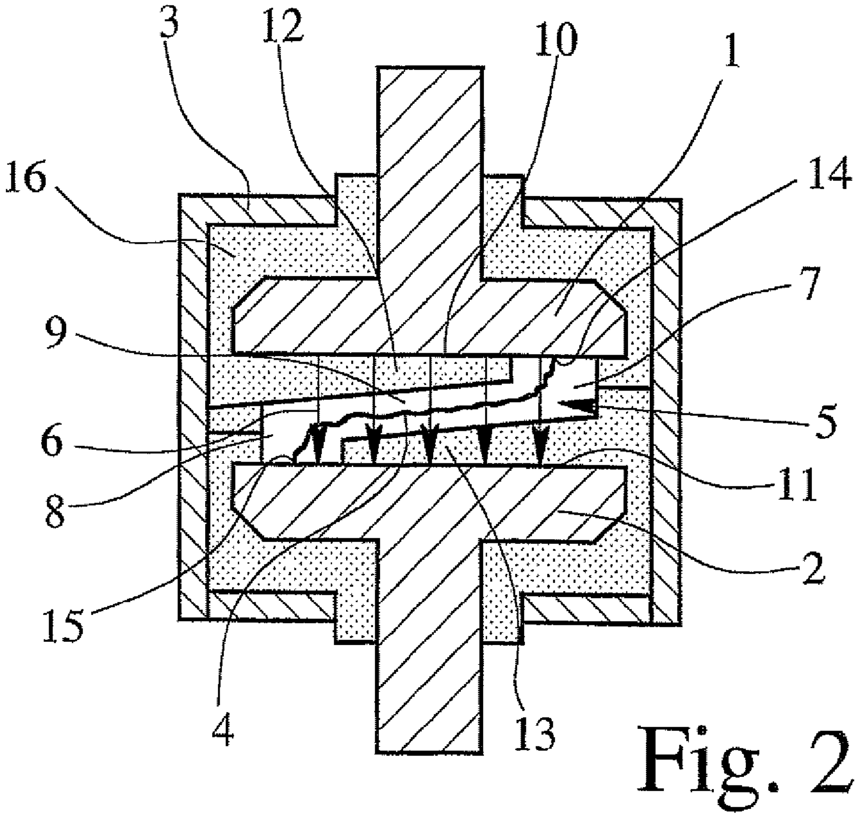
FIG. 2 is a schematic representation of a second exemplary embodiment of the overvoltage protection means in accordance with the invention.
Figure 4:
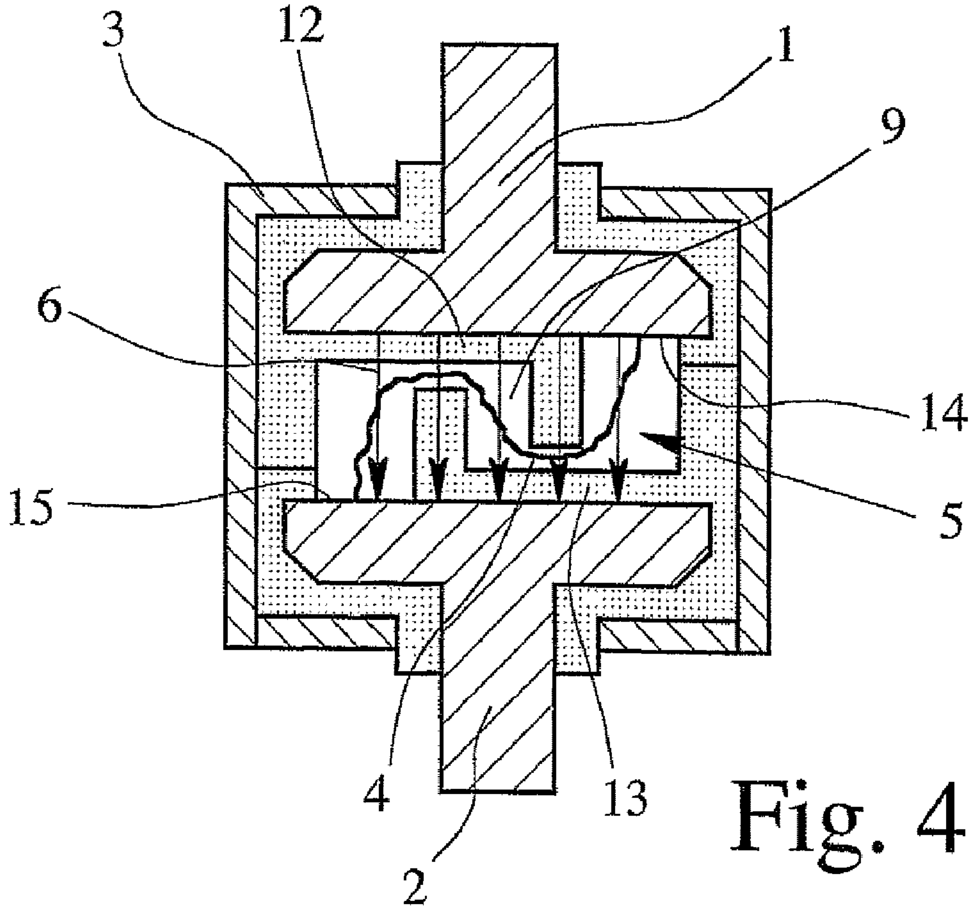
FIG. 4 is a schematic representation of a fourth exemplary embodiment of the overvoltage protection means in accordance with the invention.
Figure 5:
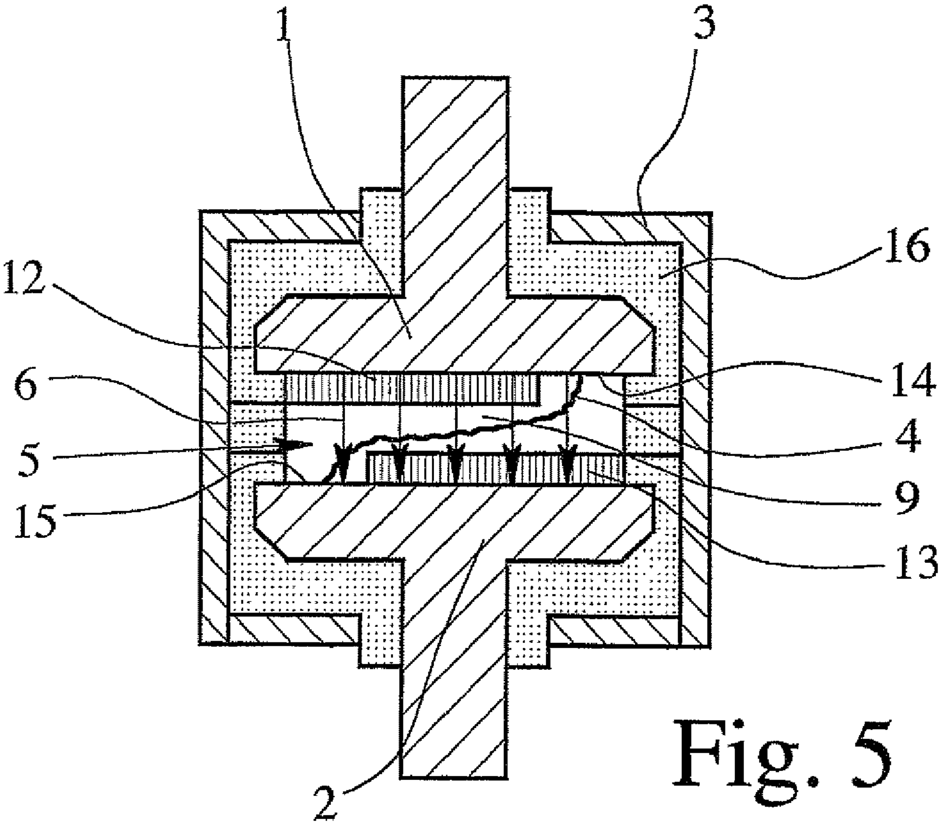
FIG. 5 is a schematic representation of another exemplary embodiment of the overvoltage protection means in accordance with the invention and FIG. 6 is a schematic representation of a sixth exemplary embodiment of the overvoltage protection means in accordance with the invention.
Figure 6:
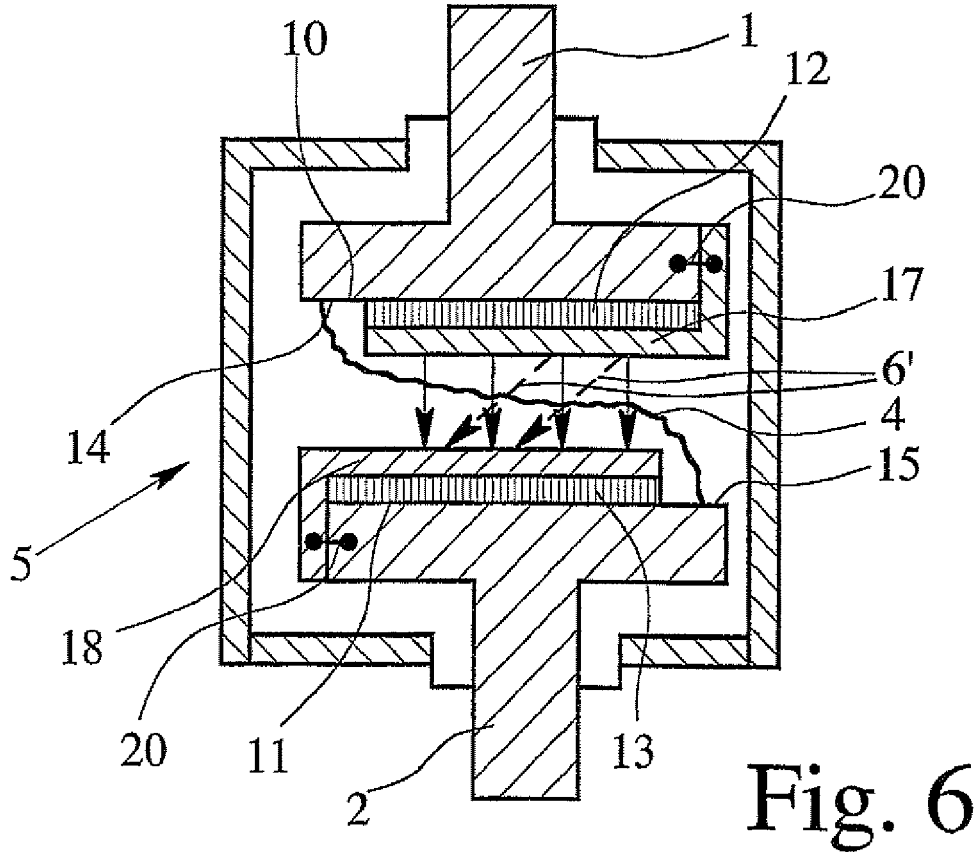

As the figures show, the discharge space 5 can be divided into three regions 7, 8, and 9. The first region 7 is connected to the first electrode 1, the second region 8 is connected to the second electrode 2 and the first region 7 is connected to the second region 8 via the third region 9. In the embodiments shown in the figures, the first region 7 and the second region 8 run essentially parallel to the direction of the electrical field. Conversely, the third region 9 in the exemplary embodiment as shown in FIGS. 1, 5 and 6 runs essentially perpendicularly or transversely to the direction of the electrical field. In the embodiment as shown in FIG. 2, the third region 9 of the discharge space 5 runs obliquely and in the embodiment shown in FIG. 3, obliquely opposite the direction of the electrical field, i.e., the lengthwise direction of the third region 9 of the discharge space 5 has a transverse component with respect to the direction of the electrical field. In the overvoltage protection means in accordance with the invention as shown in FIG. 4, the third region 9 of the discharge space 5 has two regions which run perpendicular to the direction of the electrical field and also a region which runs opposite to the direction of the electrical field creating a serpentine path.

The alignment of the third region 9 of the discharge space 5 obliquely, transversely or opposite to the direction of the electrical field of the prevailing line voltage results in the free discharge carriers contained in the plasma no longer being continuously accelerated from the first electrode 1 to the second electrode 2 or vice versa, preventing the formation of a line follow current.

To implement the discharge space 5, on the side 10 of the first electrode 1 that faces the second electrode 2, there is an insulating or high resistance material 12, and an insulating or high resistance material 13 is applied to the side 11 of the second electrode 2 facing the first electrode 1. As the figures show, the insulating or high resistance material 12, 13 is not applied to the entire surface of the first electrode 1 and the second electrode 2, but is omitted from the regions 14, 15 on the first electrode 1 and the second electrode 2, respectively, which are not covered with the insulating or high resistance material 12, 13. Here, as is directly apparent from the figures, the two uncovered regions 14, 15 of the first electrode 1 and the second electrode 2, respectively, are arranged offset to one another.

Figure 3:
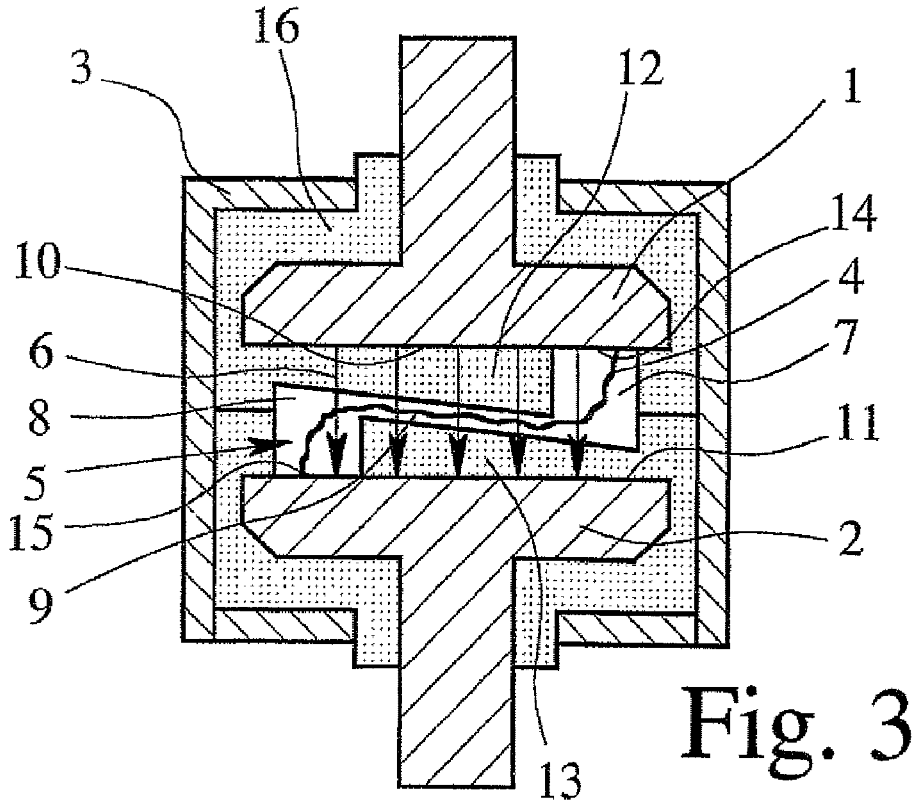
FIG. 3 is a schematic representation of another exemplary embodiment of the overvoltage protection means in accordance with the invention.

Comparison of the exemplary embodiments of the overvoltage protection means in accordance with the invention shown in FIGS. 1, 2 and 3 indicates that the shape of the discharge space 5 can be easily fixed by a corresponding choice of the dimensions of the material 12, 13. If the material 12, 13 has a constant thickness over its length, as is the case in the embodiment as shown in FIG. 1, this leads to a region 9 of the discharge space 5 which runs transversely or perpendicularly to the direction of the electrical field. If the thickness of the material 12, 13 changes over its length (FIGS. 2 & 3), this leads to a discharge space 5 which runs obliquely (FIG. 2) or partially opposite (FIG. 3) to the direction of the electrical field.

As is apparent from the embodiment shown in FIG. 4, almost any shape of the discharge space 9 can be implemented by a corresponding configuration and arrangement of the materials 12, 13 on the electrodes 1, 2. The shape of the discharge space 5 which is optimum for the respective application depends, on the one hand, on the required line follow current extinction capacity, and on the other hand, on the level of the desired sparkover voltage of the overvoltage protection means. However, the latter can also be determined by the fact that there is a suitable ignition aid, especially an active ignition aid.

The overvoltage protection means as shown in FIGS. 1 & 5 differ from one another in that, in the overvoltage protection means as shown in FIG. 1, an insulating material 12, 13 is applied to the electrodes 1, 2, while for the overvoltage protection means as shown in FIG. 5, a high resistance, but still conductive, material 12, 13 is used. The arrangement of a high resistance but still conductive material 12, 13 directly on one side 10 of the first electrode 1 and one side 11 of the second electrode 2 leads to the free charge carriers present in the discharge space 5, after the actual diversion process, being separated by the prevailing line voltage, and depending on polarity, being "sucked" from the material 12 or material 13. By reducing the number of free charge carriers in the discharge space 5, the impedance of the discharge space 5 is increased, by which, at the prevailing line voltage, the occurrence of a line follow current is also prevented. Instead of mechanical "blowout" of the plasma or free charge carriers known in the prior art, electrical "suctionl" of the free charge carriers takes place here, by which, however, likewise, the unwanted line follow current is prevented, and at the same time, the disadvantages of the known "blowout" are prevented.

FIG. 6 shows another version of overvoltage protection means. In this exemplary embodiment, comparably to the version as shown in FIG. 1, first of all, an insulating material 12, 13 is applied to the electrodes 1, 2. However, the discharge space 5 is determined not only by the shape of the insulating material 12, 13, but mainly by high resistance material 17, 18, applied additionally to the insulating material 12, 13, comparably to the version as shown in FIG. 5.

The high resistance material 17 spaced away from the region 14 is electrically conductively connected to the first electrode 1 and the high resistance material 18 spaced away from the region 15 is electrically conductively connected to the second electrode 2. The two regions 19, 20, in which the first electrode 1 is connected to the high resistance material 17 and the second electrode 2 is connected to the high resistance material 18 are likewise arranged offset to one another. The high resistance material 17, 18 first of all results in that after breakdown the free charge carriers located in the discharge space 5 are "sucked out." In doing so, a current flows through the high resistance material 17, 18; this leads to a voltage drop along the high resistance material 17, 18. Due to this voltage drop along the high resistance material 17, 18, an electrical field forms with field lines 6' having a component opposite the direction of the arc 4. Thus, a distortion of the electrical field in the discharge space 5 occurs, by which the "transverse nature" of the discharge space 5 is intensified. However, this intensification of the "transverse nature" takes place here, in contrast to the embodiment as shown in FIG. 3, not geometrically, but electrically.

Finally, it can be recognized from the figures that the housing 3, which is preferably made as a metal pressure housing, has an inner insulation housing 16, for the embodiments as shown in FIGS. 1 to 4, the insulating material 12, 13 being connected to the insulating housing 16 or to parts of the insulating housing 16.

What is claimed is:

1. Overvoltage protection means, comprising:

a first electrode, a second electrode, a breakdown spark gap having a discharge space formed between the electrodes, an arc forming between the electrodes within the discharge space when the breakdown spark gap is ignited, and a housing which holds the electrodes, wherein the discharge space is configured in a manner which runs at least one of partially transversely and partially opposite a direction of an electrical field of a prevailing line voltage so that a distance to be overcome by the arc between the two electrodes has a component that is transverse relative said direction of the electrical field; and wherein the discharge space extends from a radially outer area of the face of one of the electrodes to a diametrically opposite radially outer area of the face of the other of the electrodes, portions of the faces of the electrodes other than said diametrically opposite radially outer areas being shielded relative to said discharge space by at least one of an insulating material and a resistance material.

2. Overvoltage protection means as claimed in claim 1, wherein the discharge space has at least three regions, a first region of which is connected to the first electrode, a second region of which is connected to the second electrode and a third region of which is connected between the first region and the second region.

3. Overvoltage protection means as claimed in claim 2, wherein the third region runs essentially perpendicularly to the direction of the electrical field of the prevailing line voltage.

4. Overvoltage protection means as claimed in claim 2, wherein the third region runs partially obliquely to the direction of the electric field of the prevailing line voltage.

5. Overvoltage protection means as claimed in claim 2, wherein the third region runs partially opposite the direction of the electric field of the prevailing line voltage.

6. Overvoltage protection means as claimed in claim 1, wherein said at least one of an insulating material and a resistance material is an electrically insulating material and a resistance material having a high electrical resistance, wherein a side of the insulating material facing the second electrode and a side of the insulating material facing the first electrode are at least partially covered with the material of high electrical resistance, the first electrode being electrically conductively connected to the material of high electrical resistance on the side of the insulating material facing the second electrode in an area remote from the uncovered region of the first electrode and the second electrode being electrically conductively connected to the material of high electrical resistance on the side of the insulating material facing the first electrode in an area remote from the uncovered region of the second electrode.

7. Overvoltage protection means as claimed in claim 1, further comprising an active ignition aid.

8. Overvoltage protection means as claimed in claim 7, wherein the active ignition aid comprises a series connection of a voltage switching device and an ignition element connected to the two electrodes, the sparkover voltage of the voltage switching device being below the sparkover voltage of the breakdown spark gap so that a diversion current first flowing via the ignition element when the voltage switching device responds.

9. Overvoltage protection means as claimed in claim 8, wherein the voltage switching device is one of a varistor, suppressor diode and a gas-filled voltage arrester.

10. Overvoltage protection means as claimed in claim 8, wherein the ignition element comprises one of a conductive plastic, a metal material and a conductive ceramic and is in mechanical contact with the second electrode.

11. Overvoltage protection means as claimed in claim 1, wherein the housing is a metal pressure housing and has an inner insulation housing.

* * * * *